(12) United States Patent
Cudak et al.

(10) Patent No.: US 10,284,699 B2
(45) Date of Patent: *May 7, 2019

(54) CONTACT LIST AVAILABILITY PRIORITIZATION

(71) Applicant: International Business Machines Corporation, Armonk, NY (US)

(72) Inventors: Gary D. Cudak, Creedmor, NC (US); Christopher J. Hardee, Raleigh, NC (US); Randall C. Humes, Raleigh, NC (US); Heather C. Miller, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,185

(22) Filed: Nov. 20, 2017

(65) Prior Publication Data

US 2018/0077275 A1  Mar. 15, 2018

Related U.S. Application Data

(63) Continuation of application No. 13/339,903, filed on Dec. 29, 2011, now Pat. No. 9,854,079.

(51) Int. Cl.
*H04M 1/2745* (2006.01)

(52) U.S. Cl.
CPC .. *H04M 1/274583* (2013.01); *H04M 2250/12* (2013.01)

(58) Field of Classification Search
CPC ............... H04M 1/274583; H04M 2250/12
(Continued)

(56) References Cited

U.S. PATENT DOCUMENTS

| 6,873,854 B2 * | 3/2005 | Crockett | H04M 3/56 455/518 |
| 6,990,353 B2 * | 1/2006 | Florkey | H04W 76/40 455/519 |

(Continued)

OTHER PUBLICATIONS

Horvitz et al., Coordinate: Probabilistic Forecasting of Presence and Availability, Proc. of the 18th Conf. on Uncertainty and Artificial Intelligence, Jul. 2002, p. 224-233.

*Primary Examiner* — Shahriar Behnamian
(74) *Attorney, Agent, or Firm* — Steven M. Greenberg, Esq.; Shutts & Bowen LLP

(57) ABSTRACT

A method for contact list prioritization according to predicted reachability includes loading a contact list of contacts and retrieving a reachability value for each corresponding contact in the contact list that has been computed for each corresponding contact according to usage data of each corresponding contact for an associated mobile telephone. Thereafter, contacts in the contact list that are determined to be most reachable according to a corresponding reachability value are displayed first. In one aspect, the usage data for the associated mobile telephone is based upon accelerometer data of the associated mobile telephone. In another aspect, the usage data is based upon recency or frequency of use of the mobile telephone to place telephone calls. In yet another aspect, the usage data is based upon recency or frequency of use of a messaging application executing in the associated mobile telephone. Finally, in even yet another aspect, the usage data is based upon recency or frequency of posting content to a social network through the associated mobile telephone.

20 Claims, 1 Drawing Sheet

(58) Field of Classification Search
USPC .......................................................... 455/566
See application file for complete search history.

(56) References Cited

U.S. PATENT DOCUMENTS

| | | | |
|---|---|---|---|
| 7,233,933 B2 | 6/2007 | Horvitz et al. | |
| 7,536,001 B2 | 5/2009 | Gray et al. | |
| 7,668,537 B2 | 2/2010 | De Vries | |
| 7,882,245 B2 | 2/2011 | Wang et al. | |
| 8,412,675 B2 * | 4/2013 | Alvarado | G06Q 10/109 |
| | | | 707/616 |
| 2002/0085701 A1 | 7/2002 | Parsons et al. | |
| 2005/0097473 A1 | 5/2005 | Malik et al. | |
| 2005/0143111 A1 * | 6/2005 | Fitzpatrick | H04W 76/45 |
| | | | 455/518 |
| 2009/0276412 A1 * | 11/2009 | Anderson | G06Q 30/02 |
| 2010/0039216 A1 * | 2/2010 | Knight | G01S 5/0027 |
| | | | 340/5.1 |
| 2010/0050086 A1 | 2/2010 | Sherrard et al. | |
| 2010/0235748 A1 * | 9/2010 | Johnson | G06Q 30/00 |
| | | | 715/730 |
| 2010/0246571 A1 * | 9/2010 | Geppert | G06F 3/04817 |
| | | | 370/352 |
| 2010/0330972 A1 | 12/2010 | Angiolillo | |
| 2011/0197140 A1 | 8/2011 | Seeger et al. | |

\* cited by examiner

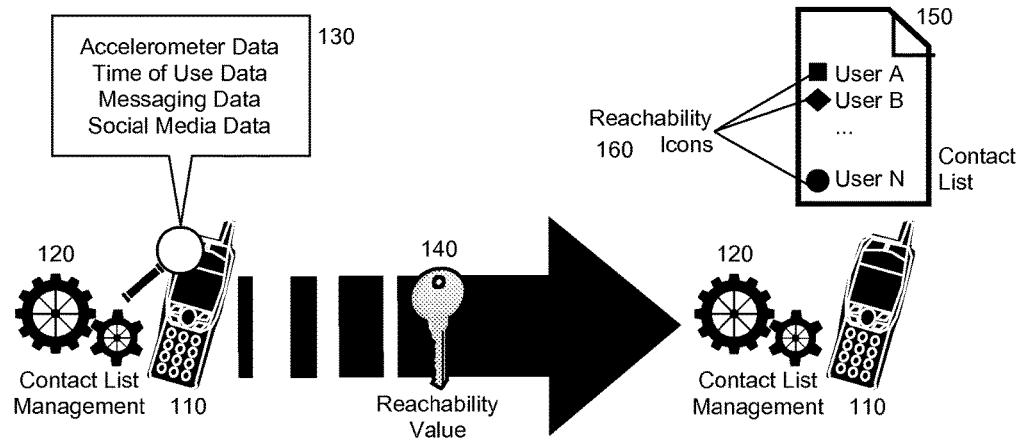
FIG. 1
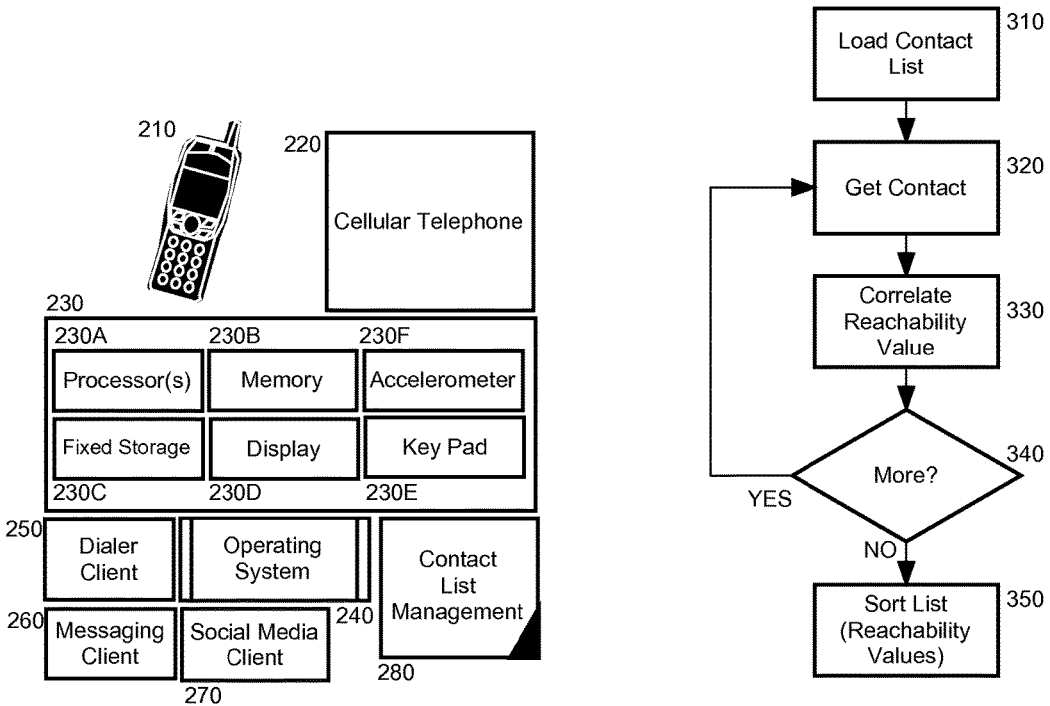
FIG. 2  FIG. 3

CONTACT LIST AVAILABILITY PRIORITIZATION

CROSS-REFERENCE TO RELATED APPLICATIONS

This application is a Continuation of U.S. application Ser. No. 13/339,903, filed Dec. 29, 2011, the entirety of which is incorporated herein by reference.

BACKGROUND OF THE INVENTION

Field of the Invention

The present invention relates to contact list management for mobile contacts and more particularly to contact list management according to prospective contact reachability.

Description of the Related Art

The address book has remained part and parcel of mobile telephony since the inception of the cellular network. The address book of a mobile phone is a data store of contacts including names and telephone numbers of those known to the possessor of the mobile phone. Often referred to as a contact list, mobile phones traditionally provide both a general list of contacts and also a "speed dial" list of most frequently accessed contacts. More advanced smart phones additionally provide the capability to filter contacts in a contact list, for example in order of most frequently contacted or most recently contacted.

Oftentimes, different contacts in a list fulfill an interchangeable role such that when one contact of a role is to be reached telephonically, in the event that the contact of the role cannot be reached, reaching an alternative contact of the same role can be a satisfactory outcome. At present, the manner in which contacts of a role can be reached is best termed a brute force method. Specifically, one typically begins with an attempt to telephone a first contact of the role and continues through the list until a contact of the role is reached. To the extent that the first or second contact can be reached, the brute force method can suffice. However, where the first available and reachable contact of a role resides four or more entries deep in a contact list filtered by role, the manually intensive brute force method can be extraordinarily wasteful.

The buddy list is a form of contact list common in the instant messenger space in which a list of contacts can be grouped together in a list of most frequently accessed contacts. Further, the availability and reachability of the contacts in the buddy list can be computed centrally and reported to the buddy list. Typically, the availability and reachability of a contact is determined either manually by the contact, or programmatically by detecting computing activity by the contact. The "presence awareness" of the contacts in the buddy list in turn can be conveyed to the end user visually through icons of different shapes and colors. In this way, the end user can readily identify when a contact in the buddy list is available to engage in an instant messaging session.

BRIEF SUMMARY OF THE INVENTION

Embodiments of the present invention address deficiencies of the art in respect to contact list management and provide a novel and non-obvious method, system and computer program product for contact list prioritization according to predicted reachability. In an embodiment of the invention, a method for contact list prioritization according to predicted reachability is provided. The method includes loading a contact list of contacts in memory of a host computer and retrieving a reachability value for each corresponding contact in the contact list that has been computed for each corresponding contact according to usage data of each corresponding contact for an associated mobile telephone. Thereafter, ones of the contacts in the contact list that are determined to be most reachable according to a corresponding reachability value are displayed first.

In one aspect of the embodiment, the usage data for the associated mobile telephone is based upon accelerometer data of the associated mobile telephone. In another aspect of the embodiment, the usage data for the associated mobile telephone is based upon recency or frequency of use of the mobile telephone to place telephone calls. In yet another aspect of the embodiment, the usage data for the associated mobile telephone is based upon recency or frequency of use of a messaging application executing in the associated mobile telephone. Finally, in even yet another aspect of the embodiment, the usage data for the associated mobile telephone is based upon recency or frequency of posting content to a social network through the associated mobile telephone.

Of note, the contacts in the contact list can be organized according to a common role for the contacts. As such, a directive can be received to dial a contact of the common role most likely to be reached. In response to receiving such a directive, the reachability values for each of the contacts of the common role can be computed and a contact of the common role determined most likely to be reachable can be dialed. In the event that a telephone call cannot be completed with the contact of the common role determined most likely to be reachable, a contact of the common role determined to be next most likely to be reached can be dialed. The process can repeat until such time as a telephone call can be completed to a contact of the common role, or until no contacts of the common role remain to be dialed.

In another embodiment of the invention, a data processing system can be configured for contact list prioritization according to predicted reachability. The system can include a mobile telephone and a host computer with at least one processor and memory disposed within the mobile telephone. The system additionally, can include a contact list management module executing in the memory of the host computer. The module can include program code enabled to load a contact list of contacts in memory of the host computer in the mobile telephone, to retrieve a reachability value for each corresponding contact in the contact list that has been computed for each corresponding contact according to usage data of each corresponding contact for an associated mobile telephone, and to display in a display of the mobile telephone ones of the contacts first in the contact list that are determined to be most reachable according to a corresponding reachability value.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for contact list prioritization according to predicted reachability;

FIG. 2 is a schematic illustration of a data processing system configured for contact list prioritization according to predicted reachability; and, FIG. 3 is a flow chart illustrating a process for contact list prioritization according to predicted reachability.

DETAILED DESCRIPTION OF THE INVENTION

Embodiments of the invention provide for contact list prioritization according to predicted reachability. In accordance with an embodiment of the invention, different mobile phones in a cellular network can track usage data of the mobile phone and the usage data can be processed into a reachability value. The reachability value in turn can be provided to the cellular network and consumed by different contact lists of other mobile phones in the cellular network in order to rank contacts in the contact lists in order to sort the ranked contacts according to likely reachability. In this way, a mobile phone user seeking to contact a person in the contact list can select a person most likely to be reached.

In further illustration, FIG. 1 pictorially shows a process for contact list prioritization according to predicted reachability. As shown in FIG. 1, a mobile telephone 110 can be configured with contact list management logic 120. The logic 120 can compute the reachability of a person associated with the mobile telephone 110 by computing a reachability value 140 from use data 130 of the mobile telephone 110 such as accelerometer data, last time of use data or frequency of use data, messaging data, or social media data. Thereafter, the reachability value 140 can be provided to contact list management logic 120 in a different mobile telephone 110 with which the logic 120 can sort contacts in a contact list 150 according to the reachability value 140. Further, each contact in the contact list 150 can include a reachability icon 160 indicating a reachability of the contact according to the reachability value 140 for a mobile telephone 110 of the contact.

Of note, the reachability value 140 can be computed so as to provide a numerical indication of the contemporaneous reachability of a contact based upon use data 130 of a corresponding mobile telephone 110. For example, the use data 130 can include accelerometer data of the mobile telephone 110 indicating the movement of a contact holding the mobile telephone 110, time of use data indicating that the mobile telephone is either frequently used, or more recently used, messaging data indicating that the contact had transmitted messages using a messaging application in the mobile telephone 110, or social media data indicating that the contact through the mobile telephone 110 had posted contact to a social network. The reachability value 140 can be computed within the mobile telephone 110 and transmitted to other mobile telephones 110 or to a central server, or the use data 130 can be transmitted to other mobile telephones 110 or to a central server from which the reachability value 140 can be computed.

The process illustrated in connection with FIG. 1 can be implemented within a data processing system configured for cellular telephony. In yet further illustration, FIG. 2 schematically shows a data processing system configured for contact list prioritization according to predicted reachability. The system can include a mobile telephone 210 including cellular telephone circuitry 220 and also a host computer 230. The host computer 230 can include one or more processors 230A, memory 20B, fixed storage 230C, a display 230D and a keypad 230E. The host computer 230 also can include an accelerometer 230F. An operating system 240 can execute in the memory 230B of the host computer 230 of the mobile telephone 210. The operating system 240 in turn can support the operation of a dialer client 250 programmed to provide a computer user interface to managing the cellular telephone 220. The operating system 240 also can support the operation of a messaging client 260, such as a text messenger, instant messenger, e-mail messenger, or any combination thereof. Finally, the operating system can support the operation of a social media client 270 through which an end user can post textual, audio and/or visual material to a social network from the mobile telephone 210.

Notably, the operating system 240 can support the operation of a contact list management module 280. The module 280 can include program code that when executed by the processor 230A of the host computer 230 can manage one or more contacts in a contact list with which an end user can direct the cellular telephone 220 through the dialer client 250 to initiate a telephone call to the contact. The program code of the module 280 additionally, can filter or sort the contacts in the contact list to a subset, for example according to a role fulfilled by the contacts in the subset. Importantly, the program code of the module 280 can acquire usage data of the mobile telephone 210 in order to computer a reachability value for a possessor of the mobile telephone 210. The usage data can include, by way of example, accelerometer data from the accelerometer 230F indicating movement of the mobile telephone 210, recency or frequency of use data of the cellular telephone 220, recency or frequency of use data of the messaging client 260, or recency or frequency of use data of the social media client 270. Finally, the program code of the module 280 can be enabled to retrieve reachability values for contacts in the contact list so as to sort or filter the contact list according to contacts determined to be most reachable based upon the reachability values for each of the contacts in the contact list.

Optionally, for contacts filtered into a subset according to role, the program code of the module 280 can be additionally enabled to automatically determine a most reachable contact amongst the contacts in the subset in response to a directive to dial the most reachable contact of the role. Thereafter, the contact determined to be most reachable can be dialed. To the extent that the contact determined to be most reachable for the role does not answer the telephone call, a contact of the role determined to be the next most reachable for the role can be dialed and so forth until a dialed contact answers the telephone call. In this way, the process of telephoning a person of a specific role can be made more efficient by ordering dialing attempts by contacts deemed most reachable.

In even yet further illustration of the operation of the module 280, FIG. 3 is a flow chart illustrating a process for contact list prioritization according to predicted reachability. Beginning in block 310, a contact list can be loaded in memory of a host computer, for example a host computer embedded within a mobile telephone, and in block 320, a first contact in the contact list can be selected. In block 330, a reachability value for the contact can be retrieved and applied to the contact. In decision block 340, if further contacts remain to be processed in the contact list the process can repeat through block 320. When no further contacts remain to be processed in the contact list, in block 350, the contact list can be sorted or filtered according to the reachability values so that the contacts determined to be most reachable according to the reachability values can be displayed first in a display of the host computer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for contact list prioritization according to predicted reachability, the method comprising:
    loading a contact list of contacts in memory of a host computer, wherein the contact list comprises contacts of a common role previously defined in memory of the computer indicating a common function of each of the contacts assigned to the common role such that any one of the contacts of the common role are interchangeable with one another;
    retrieving from a remote data store, a reachability value for each corresponding contact in the contact list that has been established for each corresponding contact according to associated mobile telephone usage data of each corresponding contact;
    displaying in the host computer, ones of the contacts first in the contact list that are determined to be most reachable according to a corresponding reachability value; and,
    providing the computed reachability value to a different computer for use by the different computer in displaying contacts in a different contact list first according to the retrieved reachability value.

2. The method of claim 1, wherein the contact list comprises contacts of a common role and wherein the method further comprises:
    receiving a directive to dial a contact of the common role most likely to be reached;
    selecting an initial contact in the contact list determined to be most reachable;
    dialing the initial contact; and,
    repeating the receiving, selecting and dialing for a subsequent contact of the common role next most likely to be reached in response to a failure to reach the initial contact.

3. The method of claim 1, wherein the usage data for the associated mobile telephone is based upon accelerometer data of the associated mobile telephone.

4. The method of claim 1, wherein the usage data for the associated mobile telephone is based upon recency or frequency of use of the mobile telephone to place telephone calls.

5. The method of claim 1, wherein the usage data for the associated mobile telephone is based upon recency or frequency of use of a messaging application executing in the associated mobile telephone.

6. The method of claim 1, wherein the usage data for the associated mobile telephone is based upon recency or frequency of posting content to a social network through the associated mobile telephone.

7. A data processing system configured for contact list prioritization according to predicted reachability, the system comprising:
    a mobile telephone;
    a host computer with at least one processor and memory disposed within the mobile telephone; and,
    a contact list management module executing in the memory of the host computer, the module comprising program code enabled to load a contact list of contacts in memory of the host computer in the mobile telephone, wherein the contact list comprises contacts of a common role previously defined in memory of the computer indicating a common function of each of the contacts assigned to the common role such that any one of the contacts of the common role are interchangeable with one another, to retrieve from a remote data store, a reachability value for each corresponding contact in the contact list that has been established for each corresponding contact according to associated mobile telephone usage data of each corresponding contact, to display in the host computer, in a display of the host computer, ones of the contacts first in the contact list that are determined to be most reachable according to a corresponding reachability value; and to provide the computed reachability value to a different computer for use by the different computer in displaying contacts in a different contact list first according to the retrieved reachability value.

8. The system of claim 7, wherein the usage data for the associated mobile telephone is based upon accelerometer data of the associated mobile telephone.

9. The system of claim 7, wherein the usage data for the associated mobile telephone is based upon recency or frequency of use of the mobile telephone to place telephone calls.

10. The system of claim 7, wherein the usage data for the associated mobile telephone is based upon recency or frequency of use of a messaging application executing in the associated mobile telephone.

11. The system of claim 7, wherein the usage data for the associated mobile telephone is based upon recency or frequency of posting content to a social network through the associated mobile telephone.

12. The system of claim 7, wherein the program code of the module is further enabled to compute a reachability value for a possessor of the mobile telephone based upon usage data of the mobile telephone.

13. The system of claim 12, further comprising an accelerometer disposed in the mobile telephone, wherein the usage data is accelerometer data produced by the accelerometer for the mobile telephone.

14. The system of claim 12, further comprising a social media client executing in the memory of the host computer, wherein the usage data is a recency of posting content to a social network through the social media client.

15. The system of claim 12, further comprising a messaging client executing in the memory of the host computer, wherein the usage data is a recency of transmitting a message through the messaging client.

16. A computer program product, wherein the computer program product is not a transitory signal, for contact list prioritization according to predicted reachability, the computer program product comprising: a non-transitory computer readable storage medium having computer readable program code embodied therewith, the computer readable program code comprising: computer readable program code for loading a contact list of contacts, wherein the contact list comprises contacts of a common role previously defined in memory of the computer indicating a common function of each of the contacts assigned to the common role such that any one of the contacts of the common role are interchangeable with one another; computer readable program code for retrieving from a remote data store, a reachability value for each corresponding contact in the contact list that has been established for each corresponding contact according to associated mobile telephone usage data of each corresponding contact; computer readable program code for displaying in the host computer, ones of the contacts first in the contact list that are determined to be most reachable according to a corresponding reachability value; and, providing the computed reachability value to a different mobile telephone for use by the different mobile telephone in displaying contacts in a different contact list first according to the retrieved reachability value.

17. The computer program product of claim 16, wherein the usage data for the associated mobile telephone is based upon accelerometer data of the associated mobile telephone.

18. The computer program product of claim 16, wherein the usage data for the associated mobile telephone is based upon recency or frequency of use of the mobile telephone to place telephone calls.

19. The computer program product of claim 16, wherein the usage data for the associated mobile telephone is based upon recency or frequency of use of a messaging application executing in the associated mobile telephone.

20. The computer program product of claim 16, wherein the usage data for the associated mobile telephone is based upon recency or frequency of posting content to a social network through the associated mobile telephone.

* * * * *